United States Patent
Blau

(10) Patent No.: US 10,972,596 B1
(45) Date of Patent: Apr. 6, 2021

(54) ATTACHMENT TO A CELL PHONE

(71) Applicant: Eddie E. Blau, Los Angeles, CA (US)

(72) Inventor: Eddie E. Blau, Los Angeles, CA (US)

(73) Assignee: Innovation Specialties, Los Angleles, CA (US)

( * ) Notice: Subject to any disclaimer, the term of this patent is extended or adjusted under 35 U.S.C. 154(b) by 0 days.

(21) Appl. No.: 16/799,684

(22) Filed: Feb. 24, 2020

(51) Int. Cl.
*H04M 1/04* (2006.01)

(52) U.S. Cl.
CPC ..................... *H04M 1/04* (2013.01)

(58) Field of Classification Search
CPC ...... H04M 1/04; H04B 1/3877; H04B 1/3888
USPC ....................................................... 455/575.1
See application file for complete search history.

(56) References Cited

U.S. PATENT DOCUMENTS 9,179,565 B2 * 11/2015 Cho ................ F16M 13/04
9,671,064 B2 * 6/2017 Tussy ................ F16M 13/04
10,200,518 B2   2/2019 Richter
2018/0302114 A1  10/2018 Neilsen
2019/0126154 A1   5/2019 Sears

FOREIGN PATENT DOCUMENTS

| CN | 206777847 U | 12/2017 |
|---|---|---|
| CN | 207518643 U | 6/2018 |
| CN | 208210048 U | 12/2018 |
| KR | 200472008 Y1 | 3/2014 |
| TW | M4300901 | 5/2012 |
| TW | M505843 | 8/2015 |
| WO | WO201900027078 A1 | 2/2019 |

* cited by examiner

Primary Examiner — Eugene Yun

(57) ABSTRACT

An apparatus for retaining a cell phone which includes: (1) a swivel base affixed to the back of a cell phone; (2) a rotatable base which can rotate within the swivel base so that the rotatable base and its attachments can be orientated to any orientation relative to the cell phone; and (3) an ability to hold the cell phone with a single finger on the back of the cell phone. When not in use, the entire assembly can collapse into a flat base so that it occupies very little space relative to the entire width of the cell phone. Bent pivot arms enable the cell phone accessory to be folded flat or to be expanded to the full size condition, or any distance between the back of the cell phone and the base so that any size finger, within a range, can fit within the space between the retaining base and the expandable bent pivot arms.

6 Claims, 13 Drawing Sheets

ATTACHMENT TO A CELL PHONE

BACKGROUND OF THE INVENTION

1. Field of the Invention

The present invention relates to the field of cell phone and in particular, to the field of cell phone attachments.

2. Description of the Prior Art

The following 11 patents and published patent applications are the closest prior art references known to the inventor.
1. U.S. Pat. No. 9,179,565 issued to Sung-mok Cho on Nov. 3, 2015 for "Portable Electronic Device Holder";
2. United States Published Patent Application No. 2018/0302114 to Gregory F. Neilsen on Oct. 18, 2018 for "Swivel Case for Phone";
3. U.S. Pat. No. 10,200,518 issued to Harald Richter on Feb. 5, 2019 for "Holding Device, in Particular for Mobile Phones";
4. United States Published Patent Application No. 2019/0126154 to Joshua N. Sears on May 2, 2019 for "Spinning Device";
5. Taiwan Patent Publication No. TWM4300901 to Jin-Yi Qui on May 21, 2012;
6. Korean Patent Publication No. KR200472008Y1 to Bong Cheol Kim on Mar. 24, 2014 for "Mobile Phone Holder with Replaceable Finger Rings";
7. Taiwan Patent Publication No. TWM505843 on Aug. 1, 2015;
8. Chinese Patent Publication No. CN206777847U to Ling Zilong on Dec. 22, 2017 for "Ring Cell Phone Top";
9. Chinese Patent Publication No. CN207518643U on Jun. 19, 2018 for "A Rotary Buckle Assembly";
10. Chinese Patent Publication No. CN208210048U to Zeng Mengran on Dec. 7, 2018 for "Mobile Phone Bracket";
11. PCT Publication No. WO2019027078A1 to Gi-Hyeon Kim on Feb. 7, 2019 for "Mobile Phone Holder".

SUMMARY OF THE INVENTION

The present invention is an accessory for a cell phone. It is an object of the present invention to provide an apparatus for retaining a cell phone to facilitate an optimal viewing angle for the user to view and use the cell phone. The rotating base allows the user to change the viewing direction while the expandable/collapsible plastic legs allow for viewing angle adjustments. As a result, the user can lean or prop up the cell phone with ease.

It is an additional object of the present invention to provide a comfortable ergonomic fit with the user's finger inserted in between the top plastic and bottom plastic with the user's palm against the back of a cell phone.

It is also an object of the present invention to provide a device to enable a user to place a finger through the opening between the pivot arms so that the person can hold the cell phone with a single finger. In addition to just having the pivot arms which enable a person to hold the cell phone with a single finger, the present invention provides the user with the ability to rotate the present invention relative to the swivel base that is affixed to the cell phone. As a result, a person can rotate the cell phone into any desired orientation while they are speaking and in addition, can rotate the cell phone to be in an angular position as shown in the drawings.

The key features of the invention are as follows: (1) a swivel base affixed to the back of a cell phone; (2) the retaining base rotatably attached to the swivel base so that it can rotate about the swivel base so that the retaining base and its attachments can be orientated to any orientation relative to the cell phone; (3) the ability to hold the cell phone with a single finger on the back of the cell phone; (4) when not in use, the entire assembly can collapse into a flat base so that it occupies very little space relative to the entire width of the cell phone; (5) the bent pivot arms enable the cell phone accessory to be folded flat or to be expanded to the full size condition, or any distance between the back of the cell phone and the base so that any size finger, within a range, can fit within the space between the retaining base and the expandable bent pivot arms; and (6) the ability to entirely remove the cell phone accessory from the cell phone.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
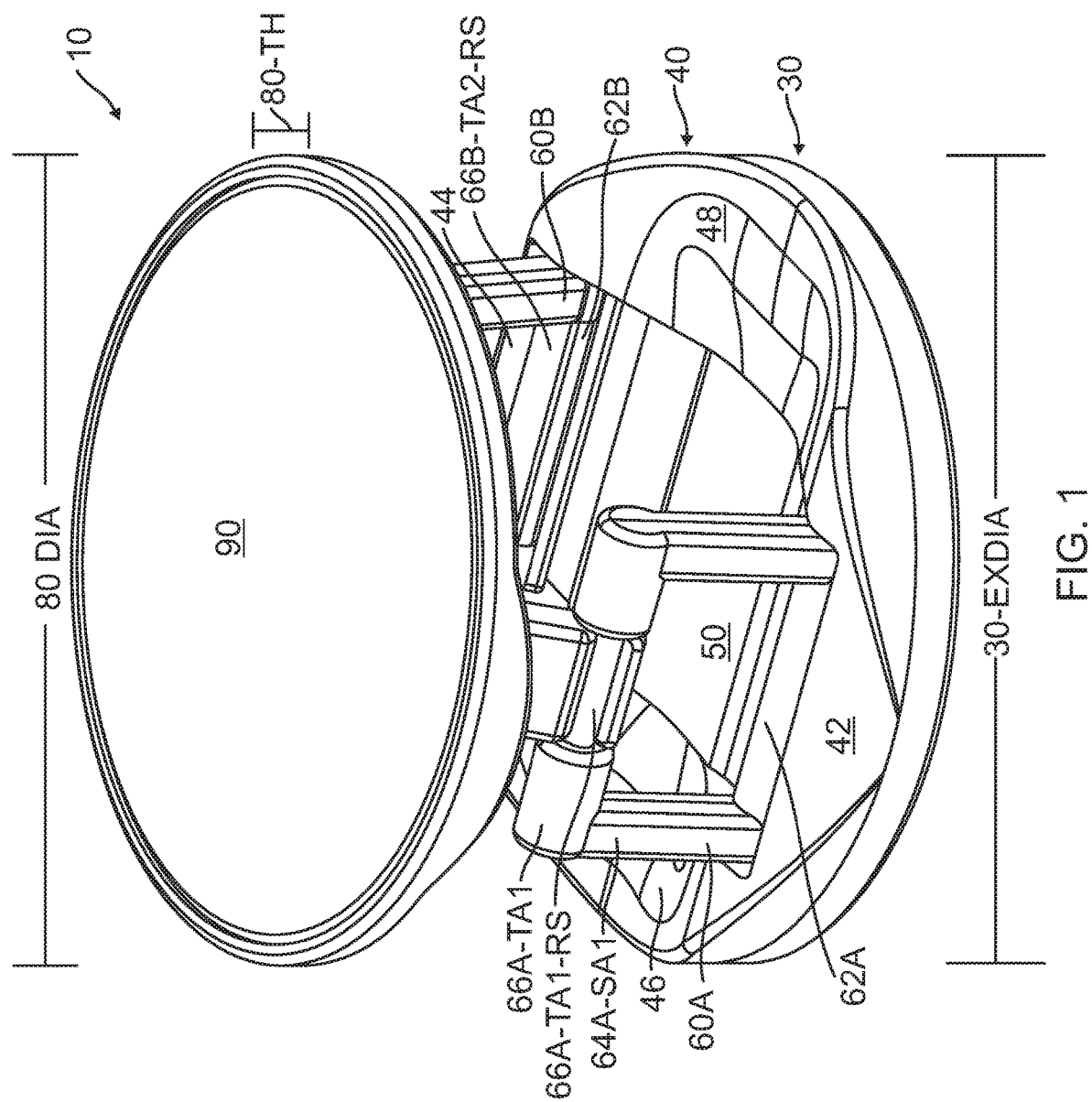
FIG. 1 is a top and front perspective view of the present invention apparatus for retaining a cell phone, illustrated in the expanded condition.
Figure 2:
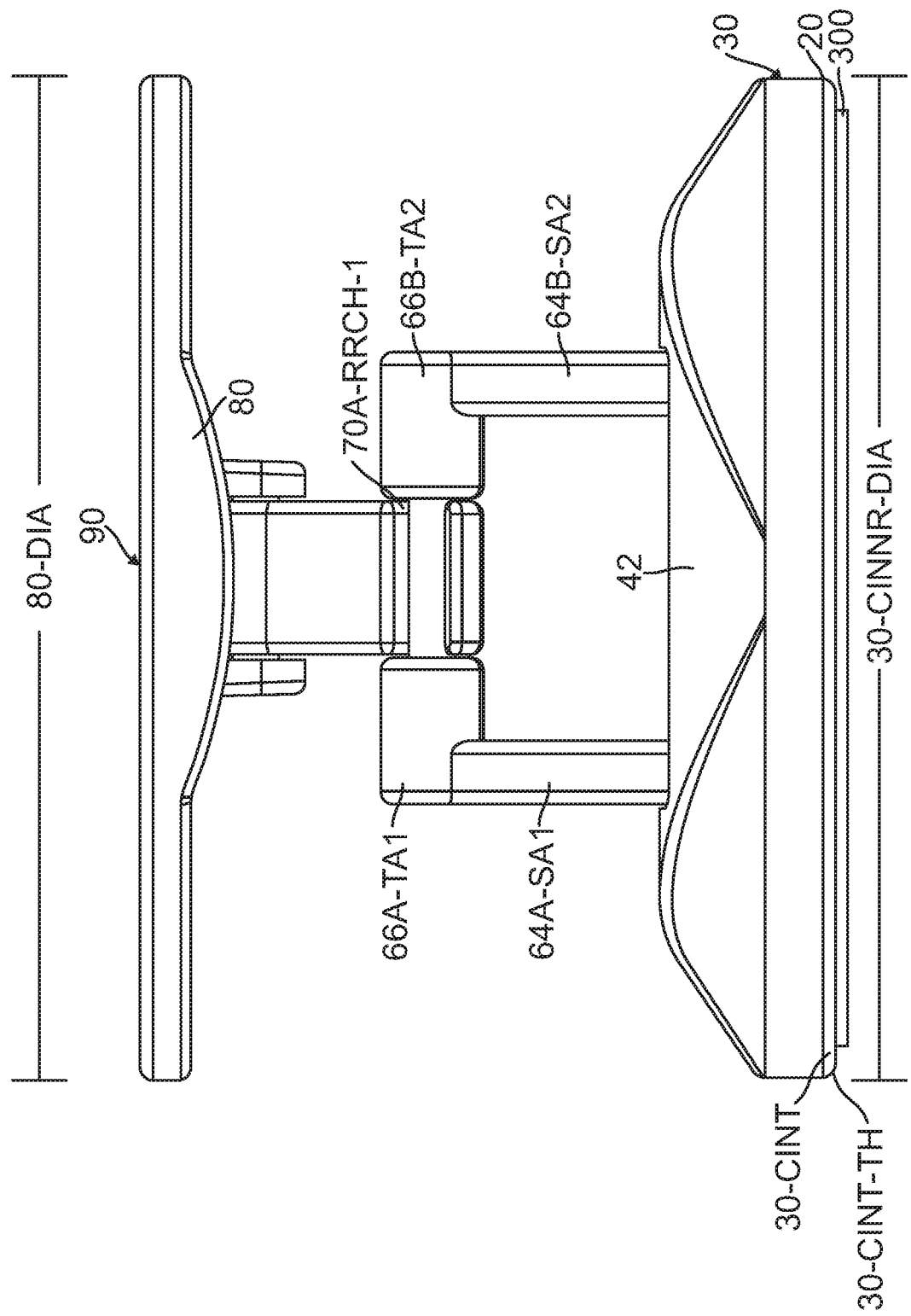
FIG. 2 is a front elevational view of the present invention apparatus for retaining a cell phone, illustrated in the expanded condition.
Figure 3:
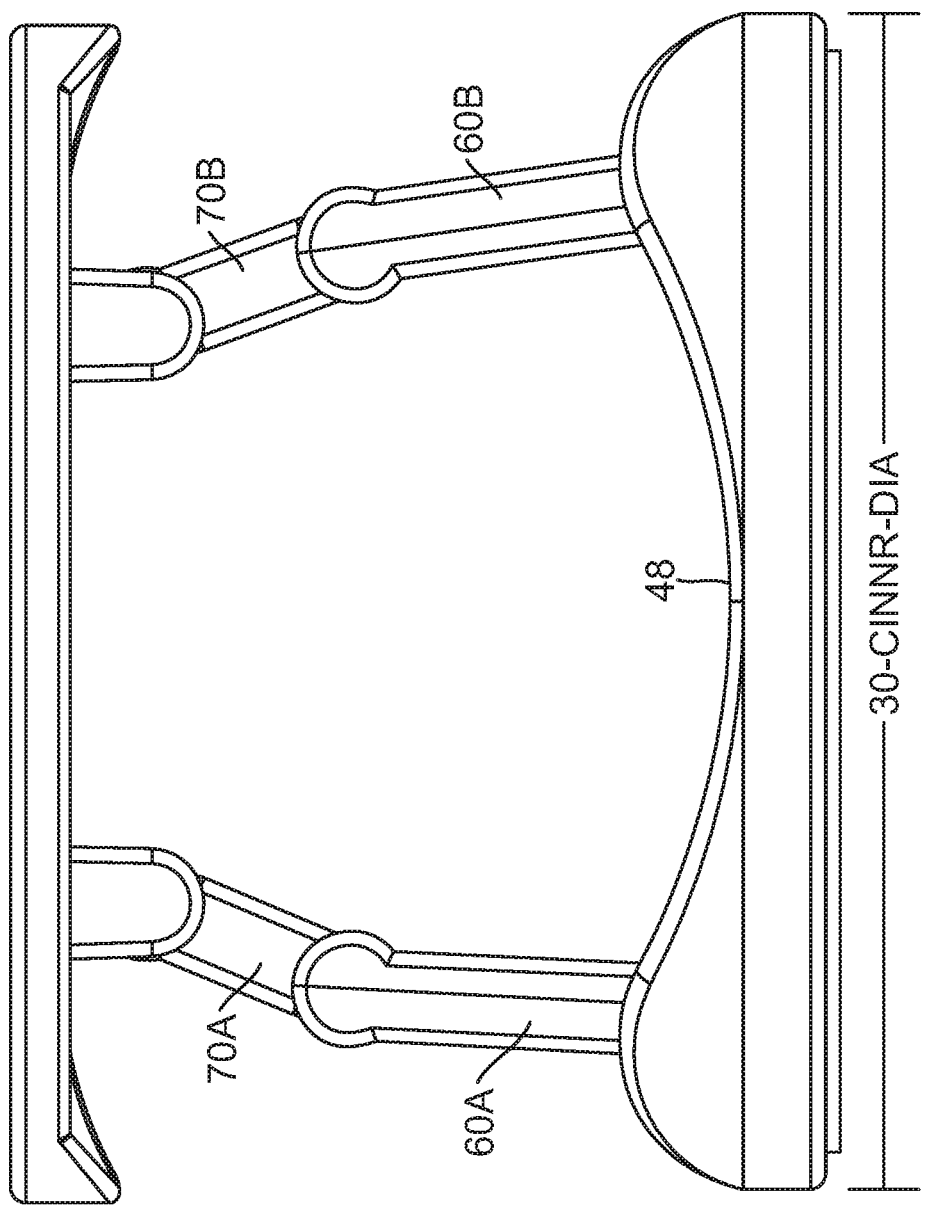
FIG. 3 is a side elevational view of the present invention apparatus for retaining a cell phone, illustrated in the expanded condition.
Figure 4A:
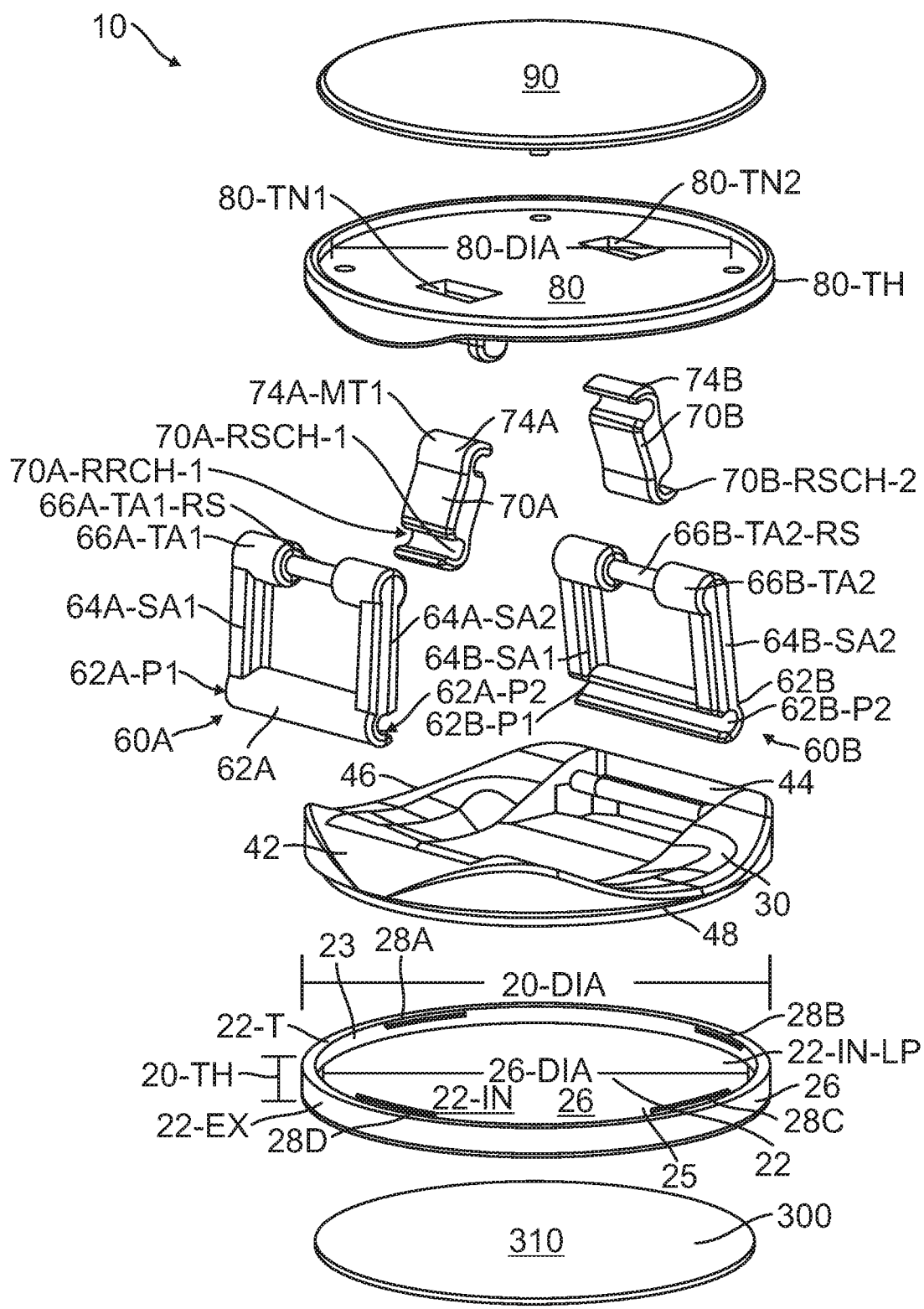
FIG. 4A is a first exploded view illustrating the components of the present invention apparatus for retaining a cell phone.
Figure 4B:
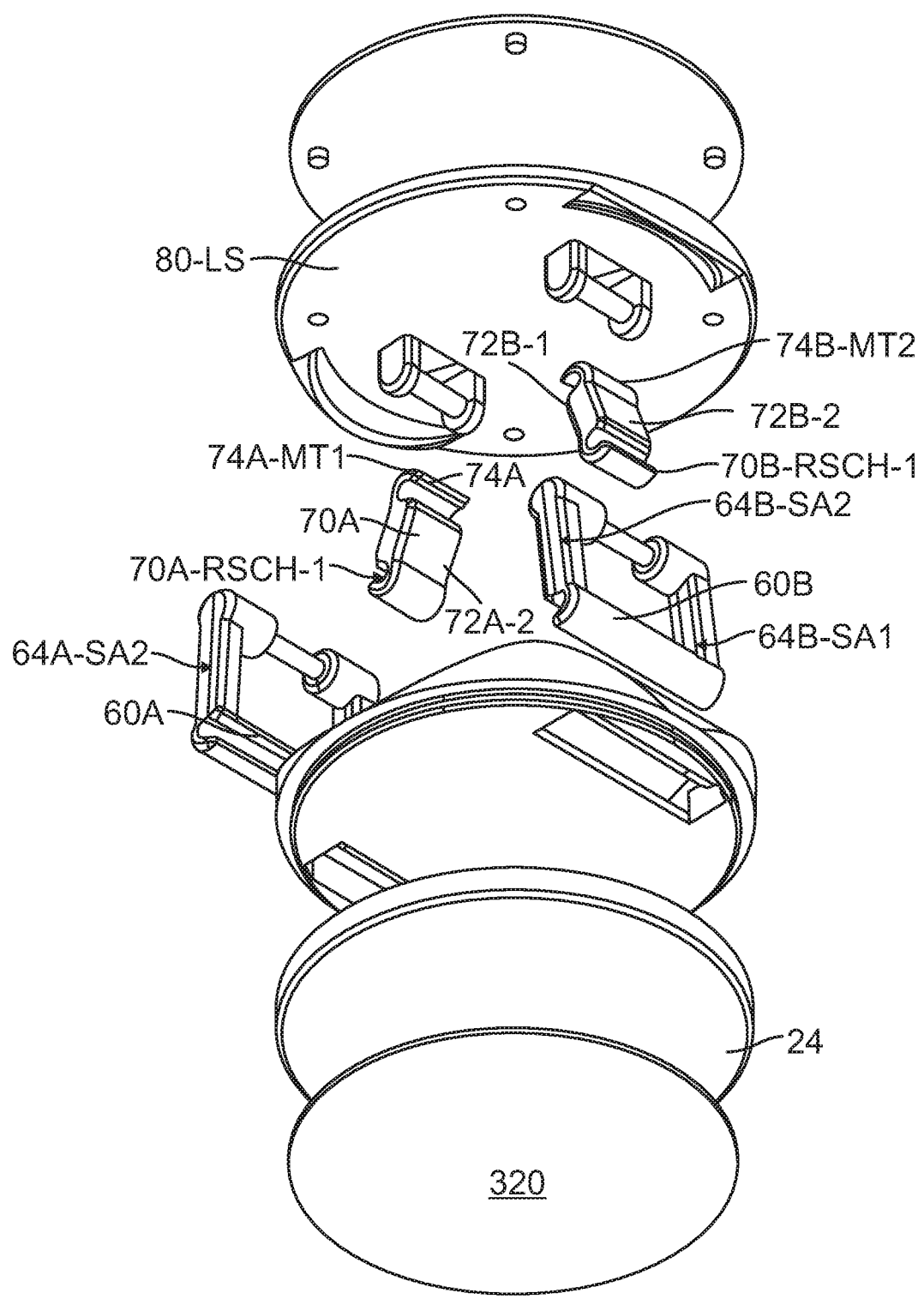
FIG. 4B is a second exploded view illustrating the components of the present invention apparatus for retaining a cell phone, oriented from a bottom perspective view and rotated ninety degrees clockwise to provide more space for part numbers and lead lines.
Figure 5:
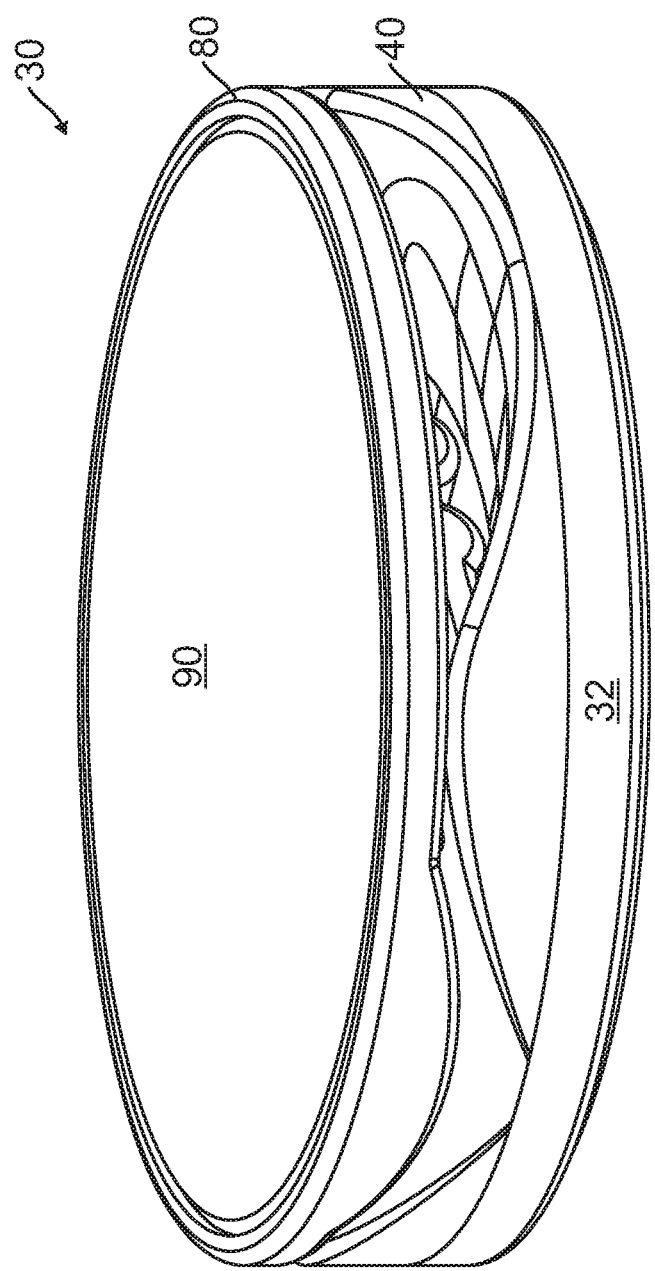
FIG. 5 is a side elevational view of the retaining base illustrated in the fully collapsed condition.

Referring to FIG. 1, there is illustrated a top and front perspective view of the present invention apparatus for retaining a cell phone 10 illustrated in the expanded condition. Referring to FIG. 2, there is illustrated a front elevational view of the present invention apparatus for retaining a cell phone illustrated in the expanded condition. Referring to FIG. 3, there is illustrated a side elevational view of the present invention apparatus for retaining a cell phone illustrated in the expanded condition. Referring to FIG. 4A, there is illustrated a first exploded view illustrating the components of the present invention apparatus for retaining a cell phone. Referring to FIG. 4B, there is illustrated a second exploded view illustrating the components of the present invention apparatus for retaining a cell phone, oriented from a bottom perspective view and rotated ninety degrees clockwise from the view in FIG. 4A to provide more space for part numbers and lead lines. Referring to FIG. 5, there is illustrated a cut-away perspective view of the base plate rotatably retained within a finger.

Referring to FIGS. 1 through 5, the present invention is an apparatus for retaining a cell phone 10, also more briefly identified in this application as "retaining apparatus 10". The retaining apparatus 10 includes a swivel base 20 which rotatably retains a base 30. The swivel base 20 has a top surface 22 including a bottom surface 24 which is affixed to an adhesive disc 300. As will be described, the adhesive disc 300 has a top surface 310 by which it is affixed to the bottom surface 24 of swivel base 20. The bottom surface 320 of adhesive disc 300 will include a cover wrapping. When the cover wrapping is removed, the bottom surface 320 of the adhesive disc 300 is affixed to the rear surface of a cell phone or comparable portable electronic device.

Further referring to FIGS. 1 through 5, the swivel base 20 has a circumferential sidewall 22 with a circumferential exterior surface 22-EX and a circumferential interior surface 22-IN which surrounds an interior chamber 26. The circumferential interior surface 22-IN includes upper circumferential teeth 28A, 28B, 28C and 28D spaced ninety degrees apart and which are adjacent the top surface 22-T leaving a circumferential gap 23 between the upper circumferential teeth 28A, 28B, 28C and 28D and the lower portion 22-IN-LP of the circumferential interior surface. The exterior surface 22-EX has a thickness of 20-TH and the interior chamber 26 has an interior diameter 26-DIA.

Figure 6:
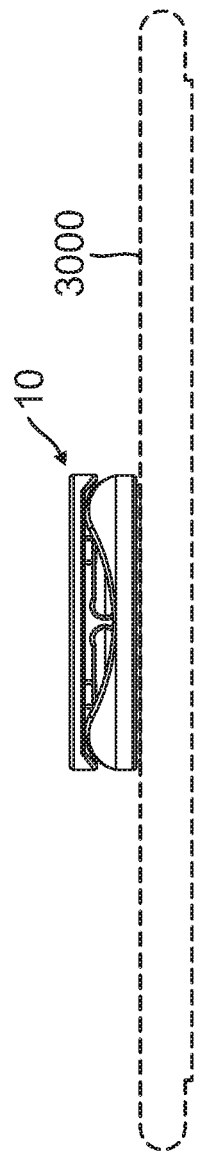
FIG. 6 is a side perspective view of the present invention apparatus for retaining a cell phone, illustrated in the fully collapsed condition, attached to the back of the cell phone illustrated in broken lines.

The base 30 of the retaining apparatus (also referred to as "retaining base 30") is also round with an exterior diameter 30-EXDIA and an interior chamber 30-CINT having a diameter 30-CINNR-DIA and an interior thickness 30-CINT-TH sized to be rotatably retained in swivel base 20. As illustrated in FIGS. 4A and 6, the retaining base 30 has an exterior circumferential wall 32 which is snap fit retained within chamber 26 and rotatably retained against lower interior surface 25 of interior base surface 22-IN and retained therein by teeth 28A, 28B, 28C and 28D so that the retaining base 30 can rotate within the interior chamber 26 of swivel base 20. Therefore, once swivel base 20 is affixed, such as to a back surface of a cell phone, the retaining base 30 is rotatable relative to the object to which the swivel base 20 is affixed.

Additionally referring to FIGS. 1 through 4, the retaining base 30 has a top section 40 including a front recessed arcuate sidewall 42, a parallel opposite rear arcuate recessed sidewall 44, a left recessed arcuate sidewall 46 and a parallel opposite right arcuate recessed sidewall 48. Each of the four recessed arcuate sidewalls 42, 44, 46 and 48 are identical. The front and rear recessed arcuate sidewalls 42 and 44, are each at ninety degrees to both the left and right arcuate recessed sidewalls 46 and 48. The four arcuate recessed sidewalls surround an interior section 50.

As best illustrated in FIGS. 1, 2, 3 and 4A, one pair of components is a first straight pivot arm 60A and a second straight pivot arm 60B. First straight pivot arm 60A includes a first lower base 62A with opposite pin members 62A-P1 and 62A-P2. The first lower base 62A extends to oppositely disposed parallel side arms 64A-SA1 and 64A-SA2 which extend to upper transverse arm 66A-TA1 with a central recessed portion 66A-TA1-RS. The upper transverse arm 66A-TA1 is integrally formed with and between parallel side arms 66A-SA1 and 66A-SA2. Upper transverse arm 66A-TA1 is parallel to first lower base 62A. First lower base 62A is rotatably affixed between left recessed arcuate sidewall 46 and right recessed arcuate sidewall 48 and is adjacent front recessed arcuate sidewall 42.

Similarly, second straight pivot am 60B includes a second lower base 62B with opposite pin members 62B-P1 and 62B-P2. The second lower base 62B which extends to oppositely disposed parallel side arms 64BA-SA1 and 64B-SA2 which extend to upper transverse arm 66B-TA2 with a central recessed portion 66B-TA2-RS. The upper transverse arm 66B-TA1 is integrally formed with and between parallel side arms 64B-SA1 and 64B-SA2. Upper transverse arm 66B-TA2 is parallel to second lower base 62B. Second lower base 62B is rotatably affixed between right recessed arcuate sidewall 48 and left recessed arcuate sidewall 46 and is adjacent rear recessed arcuate sidewall 44.

As also best illustrated in FIGS. 3, 4A and 4B, the next component is a pair of bent pivot arms 70A and 70B. First bent pivot arm 70A includes a first lower recessed channel section 70A-RSCH-1 wherein a first recessed channel 70A-RRCH-1 is rotatably retained in central recessed portion 66A-TA1-RS of first upper transverse arm 66A-TA1 of first straight pivot arm 60A. The first lower recessed channel section 70A-RSCH-1 extends to integrally formed parallel first bent pivot arm 72A-1 and 72A-2 which support first bent pivot upper transverse retaining section 74A with first cylindrical mating dowel 74A-MT1 and oppositely aligned second cylindrical mating dowel 74A-MT2.

Similarly, second bent pivot arm 70B includes a second lower recessed channel section 70B-RSCH-2 wherein a second lower recessed channel 70B-RSCH-2 is rotatably retained in central recessed portion 66B-TA1-RS of second upper transverse arm 66B-TA2 of second straight pivot arm 60B. The second lower recessed channel section 70B-RSCH-2 extends to integrally formed parallel second bent pivot arm 72B-1 and 72B-2 which support second bent pivot upper transverse retaining section 74B with first cylindrical mating dowel 74B-MT1 and opposite aligned second cylindrical mating dowel 74B-MT2.

The final component is the cylindrical cap 80 which has a diameter 80-DIA and a thickness 80-TH with two interior spaced apart mating tunnels, first interior mating tunnel 80-TN1 and second interior mating tunnel 80-TN2. First cylindrical mating dowel 74A-MT1 is rotatably retained in first interior mating tunnel 80-TN1 and second cylindrical mating dowel 74B-MT2 is rotatably retained in second interior mating tunnel 80-TN2.

Referring to FIG. 5, there is illustrated a side elevational view of the swivel base 30 illustrated in the fully collapsed condition. Also illustrated is the sidewall 32 of the swivel base 30, one arcuate sidewall 40, the top cap 80 and cover 90.

Referring to FIG. 6, there is illustrated the present invention apparatus 10 retaining a cell phone, illustrated in the fully collapsed condition, attached to the back of the cell phone 3000 illustrated in broken lines.

Figure 7:
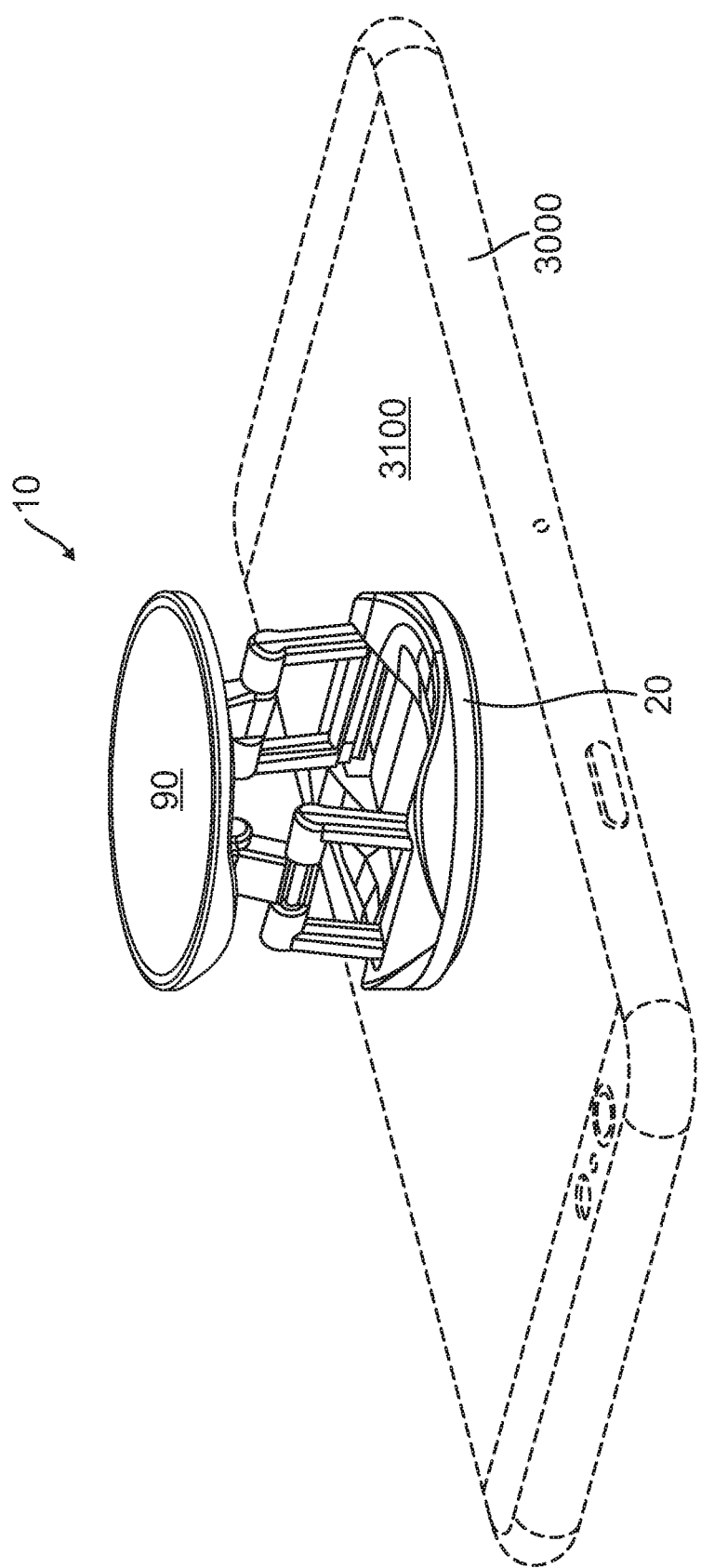
FIG. 7 is a side elevational view of the present invention apparatus for retaining a cell phone, the apparatus illustrated in the fully expanded condition and attached to the back of the cell phone illustrated in broken lines.

Referring to FIG. 7, there is illustrated a side elevational view of the present invention apparatus 10 for retaining a cell phone, the apparatus illustrated in the fully expanded condition and attached to the back 3100 of the cell phone 3000 illustrated in broken lines. Also illustrated are the swivel base 20 and the top cover 90.

Figure 8:
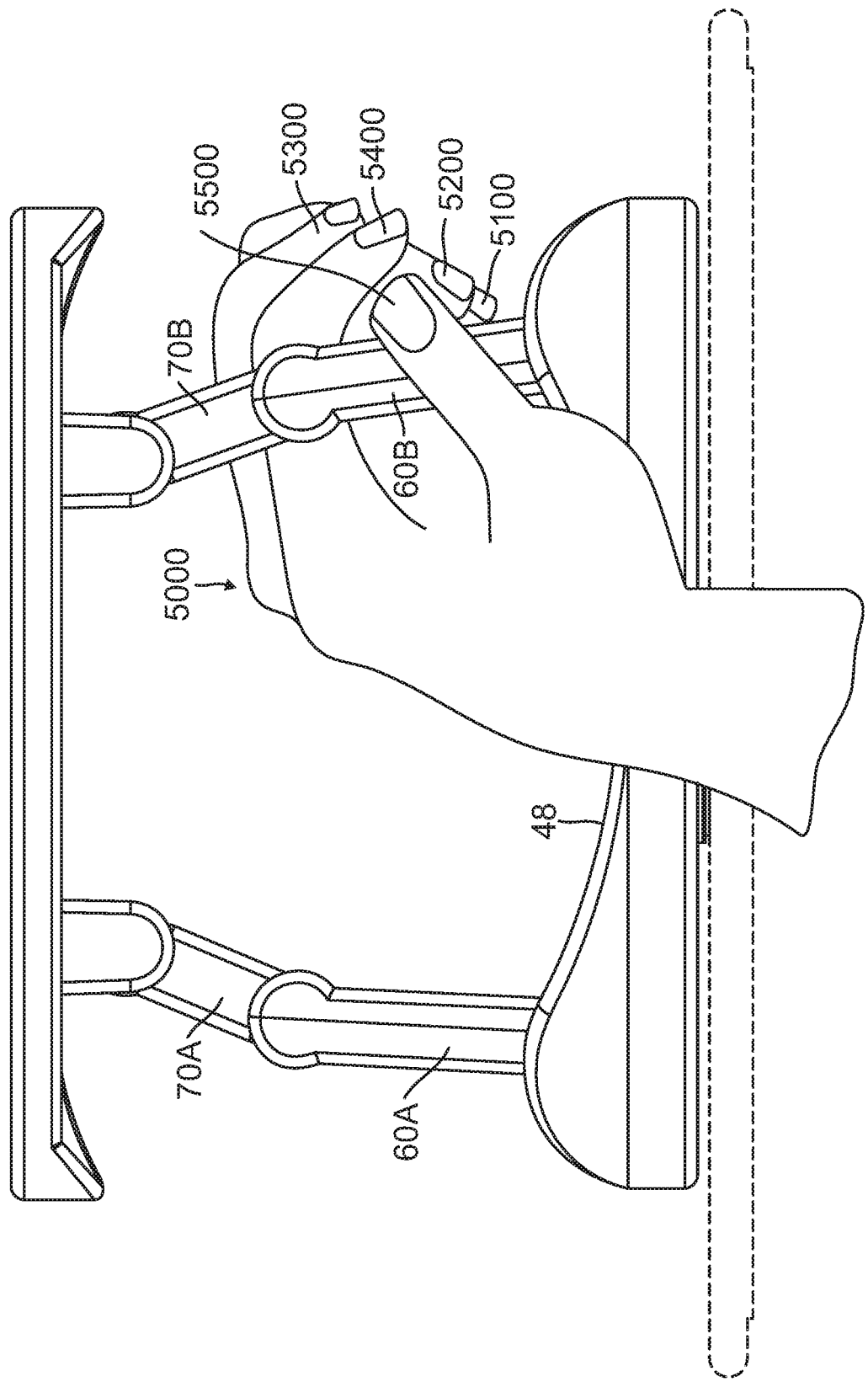
FIG. 8 is a side elevational view of the present invention apparatus for retaining a cell phone, the apparatus illustrated in the fully expanded condition and attached to the back of the cell phone illustrated in broken lines, with a hand with one finger extending through the present invention in the expanded condition, the hand and fingers illustrated in broken lines.

Referring to FIG. 8, there is illustrated a side elevational view of the present invention apparatus 10 for retaining a cell phone, the apparatus illustrated in the fully expanded condition and attached to the back of the cell phone 3000 illustrated in broken lines, with a hand 5000 with one finger 5400 extending through the present invention in the expanded condition, the hand 5000 and pinkie 5100, fourth finger 5200, middle finger 5300, forefinger 5400 and thumb 55500 illustrated in broken lines.

As illustrated in FIGS. 7 through 8, the swivel base 20 of the retaining apparatus 10 is affixed to an object such as the rear surface 3100 of a cell phone 3000. The rear surface 24 of the swivel base originally had an adhesive disc 300 which was concealed by a covering paper which was removed so that adhesive disc 300 on the rear surface 24 served to retain the rear surface 24 of the swivel base 20 on the rear surface 3100 of the cell phone 3000. The swivel base 20 included an interior chamber 28, which as previously explained, rotatably retains the retaining base 30. Therefore, the retaining base 30 is rotatable relative to the rear surface 3100 of the cell phone 3000 to orient the retaining apparatus 10 relative to the cell phone 3000.

A cover label 90 is affixed to the upper surface 80-US of cap 80. The cap is pulled away from the retaining base 30 with straight pivot arms rotating about lower base 62A and 62B to move from the flat position against the retaining base 30 as illustrated in FIG. 6 to an elevated position as illustrated in FIGS. 7 and 8. The bent pivot arms rotate about first lower recessed channel 70A-RSCH-1 and second lower recessed channel 70B-RSCH-2 from a flat position to the elevated position.

Therefore, as illustrated in FIG. 8, a person can place one finger in the interior space bounded by the retaining base 30, the pair of straight pivot arms 60A and 60B and the pair of bent pivot arms 70A and 70B and the lower surface of the cap with the palm of the same hand resting on the rear surface 3100 of the cell phone 3000.

Therefore, the size of the space is adjustable based on how high the cap 80 is relative to the retaining base 30 with the fingers sized between the pair of straight pivot arms and the pair of bent pivot arms and the lower surface 80-LS of the cap 80. The rotation of the retaining base 30 enables the person to hold the cell phone in a comfortable position for both holding as well as talking.

The cover 90 and the upper surface of the cap 80 are also used as a support base and placed at a location on the surface with the pair of straight pivot arms and the pair of bent pivot arms oriented so that the cell phone is at a proper position for use.

Figure 9:
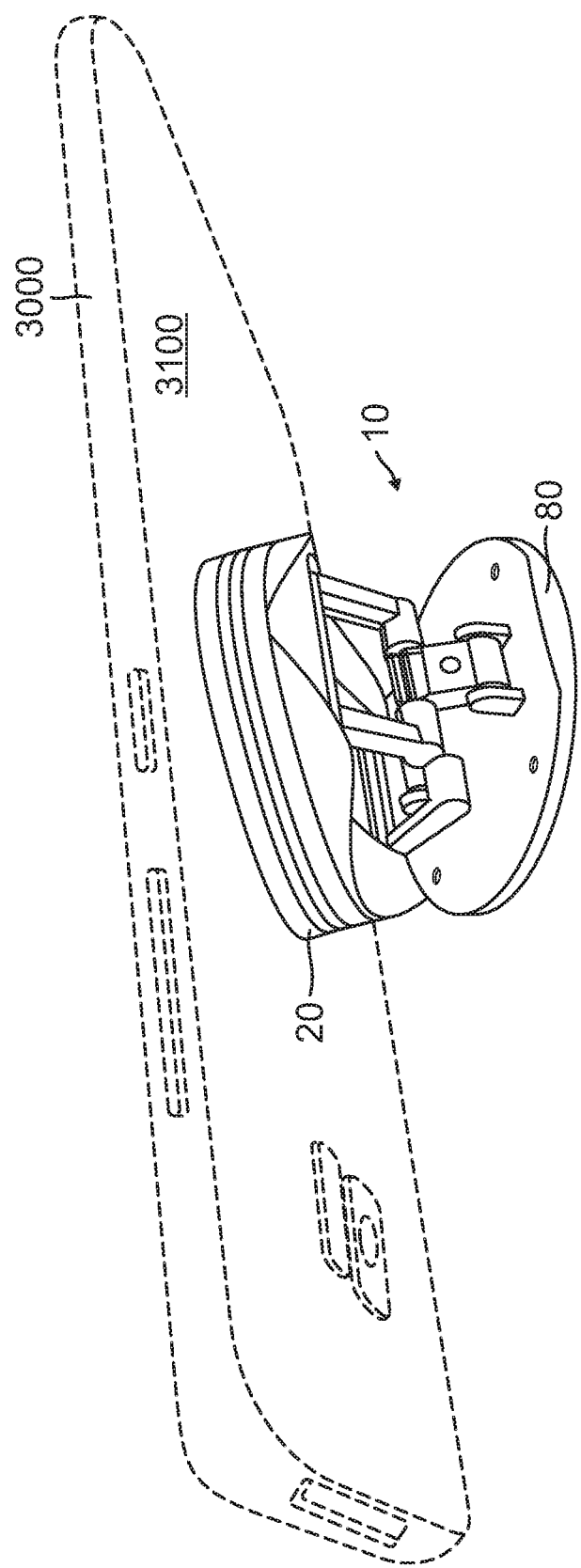
FIG. 9 is a rear and side perspective view of the present invention apparatus for retaining a cell phone, illustrated in the expanded condition, attached to the back of the cell phone illustrated in broken lines, illustrating the present invention retaining the cell phone in a horizontal condition on a surface.
Figure 10:
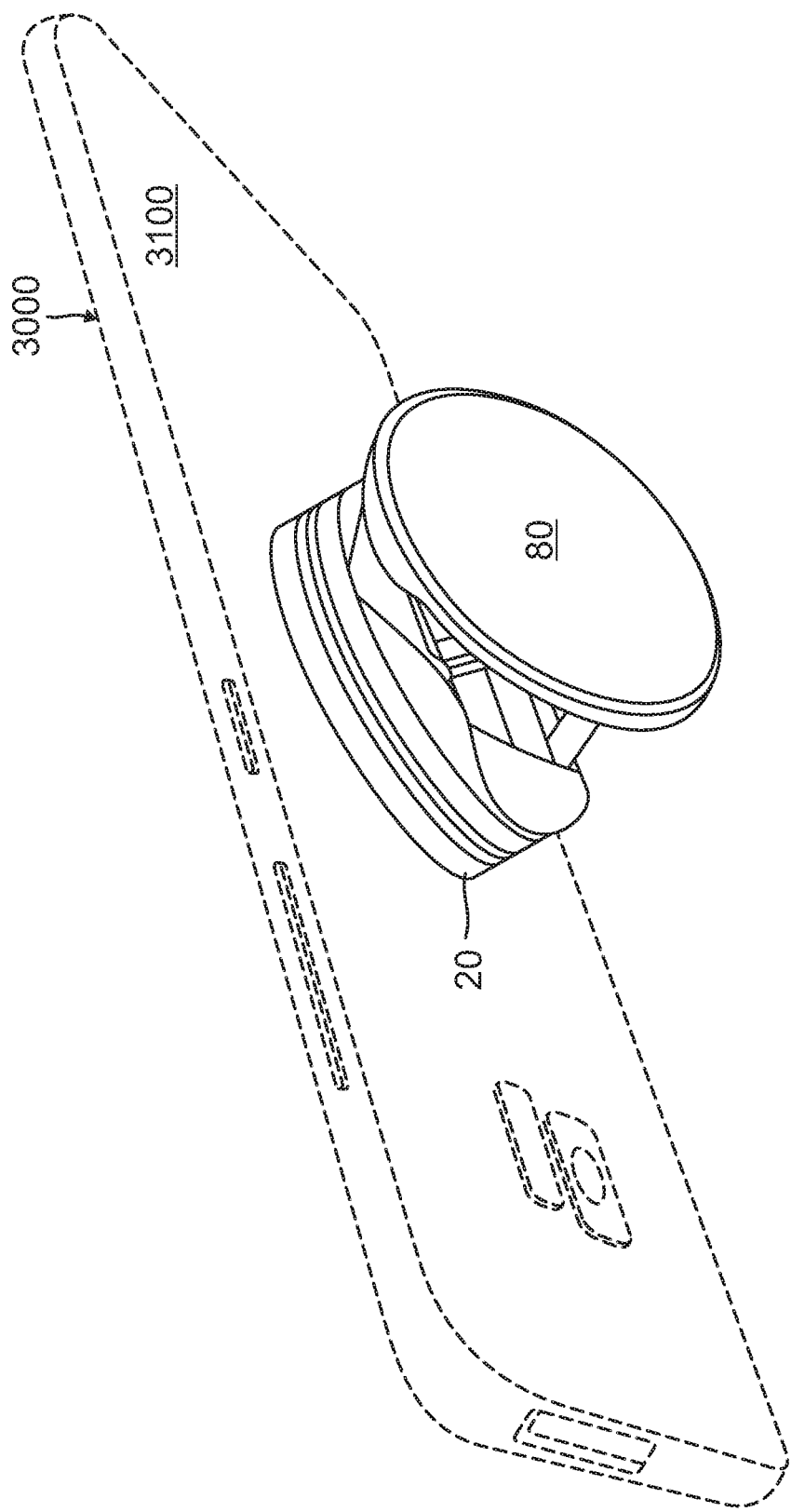
FIG. 10 is a rear and side perspective view of the present invention apparatus for retaining a cell phone, illustrated in the expanded condition, attached to the back of the cell phone illustrated in broken lines, illustrating the present invention retaining the cell phone in a horizontal condition on a surface in an alternative configuration.

Referring to FIG. 9, there is illustrated a rear and side perspective view of the present invention apparatus 10 for retaining a cell phone 3000 illustrated in the expanded condition attached to the back 3100 of a cell phone illustrated in broken lines, illustrating the present invention 10 top cover 90 retaining the cell phone 3000 in a horizontal condition on a surface. Referring to FIG. 10, there is illustrated a rear and side perspective view of the present invention apparatus 10 for retaining a cell phone 3000 illustrated in the expanded condition attached to the back 3100 of a cell phone 3000 illustrated in broken lines, illustrating the present invention 10 top cover 90 retaining the cell phone 3000 in a horizontal condition on a surface in an alternative configuration.

Figure 11:
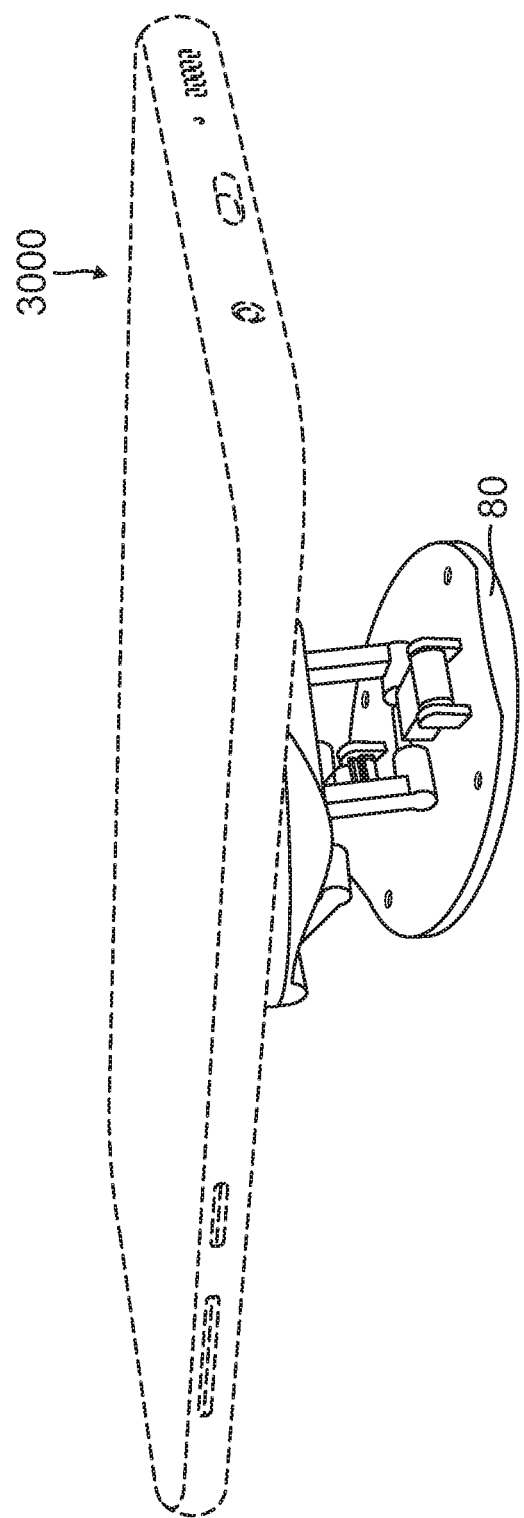
FIG. 11 is a side perspective view of the present invention apparatus for retaining a cell phone, illustrated in the expanded condition, attached to the back of the cell phone illustrated in broken lines, illustrating the present invention retaining the cell phone in a vertical condition on a surface.
Figure 12:
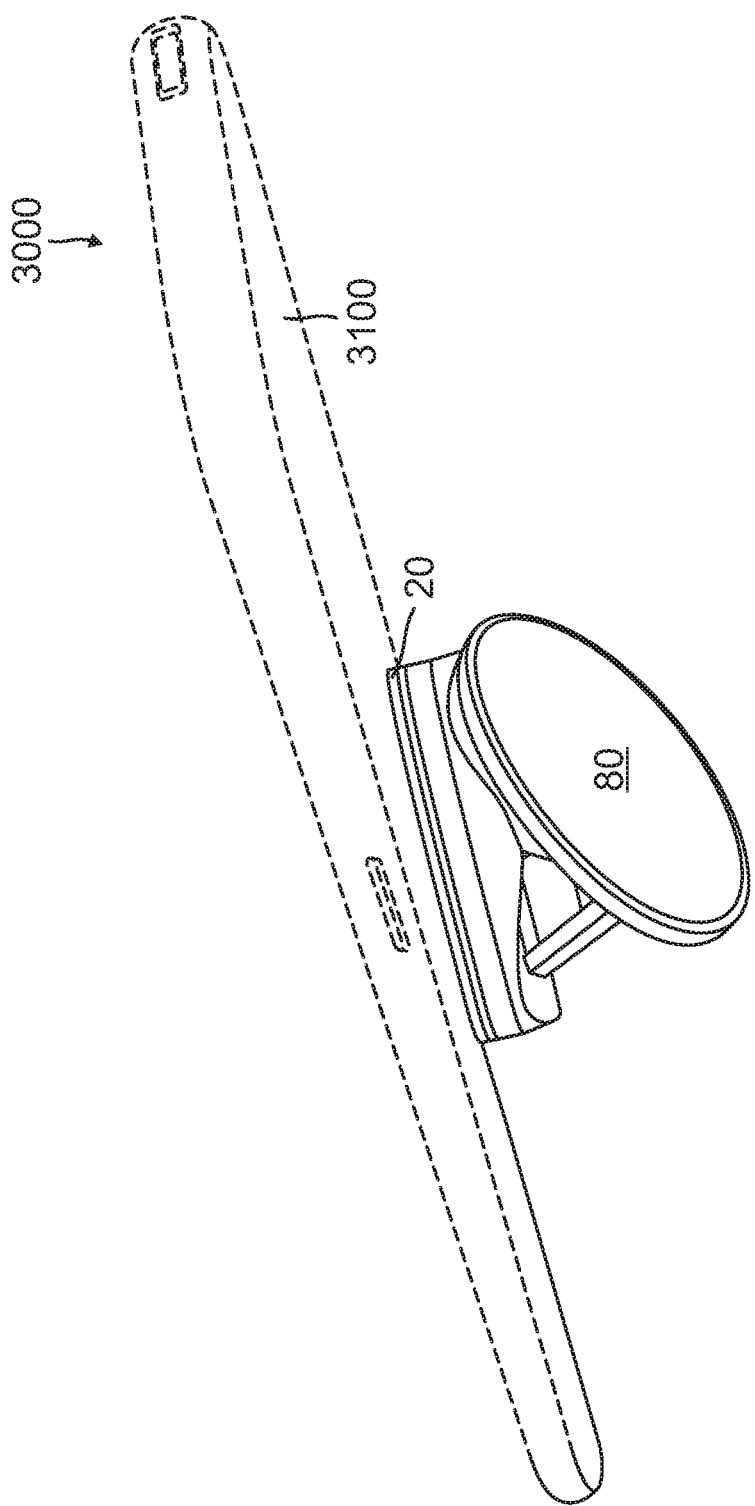
FIG. 12 is a rear and side perspective view of the present invention apparatus for retaining a cell phone, illustrated in the expanded condition, attached to the back of the cell phone illustrated in broken lines, illustrating the present invention retaining the cell phone in a vertical condition on a surface in an alternative configuration.

Referring to FIG. 11, there is illustrated a side perspective view of the present invention apparatus 10 for retaining a cell phone 3000 illustrated in the expanded condition attached to the back 3100 of a cell phone 3000 illustrated in broken lines, illustrating the present invention 10 top cover 90 retaining the cell phone 3000 in a vertical condition on a surface. Referring to FIG. 12, there is illustrated a rear and side perspective view of the present invention apparatus 10 for retaining a cell phone 3000 illustrated in the expanded condition attached to the back 3100 of a cell phone 3000 illustrated in broken lines, illustrating the top cover 90 of the present invention 10 retaining the cell phone in a vertical condition on a surface in an alternative configuration.

In addition, the retaining base 30 and the entire apparatus 10 can be removed from swivel base 20 by rotating retaining base 30 to a location between teeth 29A, 29B, 29C and 29D and pulling upward on retaining base 30.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus for retaining a cell phone comprising:
   (a) a swivel base including a top surface, a bottom surface which is affixed to a top surface of an adhesive disc, the adhesive disc having a bottom surface with a cover wrapping, the swivel base having a circumferential sidewall with a circumferential exterior surface and a circumferential interior surface which surrounds an interior chamber, the circumferential interior surface includes a multiplicity of spaced apart upper circumferential teeth which are adjacent a top surface of the swivel base leaving a circumferential gap between the multiplicity of spaced apart upper circumferential teeth a lower portion of a circumferential interior surface, creating an interior chamber within the swivel base;

(b) a retaining base sized to be rotatably retained within the interior chamber of said swivel base, the retaining base including a front recessed arcuate sidewall, a parallel opposite rear arcuate recessed sidewall, a left recessed arcuate sidewall and a parallel opposite right arcuate recessed sidewall, the front and rear recessed sidewalls are each at ninety degrees to both the left and right arcuate recessed sidewalls, the four arcuate recessed sidewalls surround an interior section;

(c) the retaining base including a first straight pivot arm having a first lower base with opposite pin members, the first lower base extends to oppositely disposed parallel side arms which extend to first upper transverse arm with a first central recessed portion, the first upper transverse arm is integrally formed with and between parallel side arms, the first upper transverse arm is parallel to first lower base, the first lower base is rotatably affixed between left recessed arcuate sidewall and right recessed arcuate sidewall and is adjacent the front recessed arcuate sidewall, a first bent pivot arm includes a first lower recessed channel section rotatably retained in the central recessed portion of the first upper transverse arm of the first straight pivot arm, the first lower recessed channel section extends to integrally formed parallel first bent pivot arms which support a first bent pivot upper transverse retaining section with a first cylindrical mating dowel;

(d) the retaining base including a second straight pivot arm having a second lower base with opposite pin members, the second lower base extends to oppositely disposed parallel side arms which extend to second upper transverse arm with a second central recessed portion, the second upper transverse arm is integrally formed with and between parallel side arms, the second upper transverse arm is parallel to second lower base, the second lower base is rotatably affixed between left recessed arcuate sidewall and right recessed arcuate sidewall and is adjacent the rear recessed arcuate sidewall, a second bent pivot arm includes a second lower recessed channel section which is rotatably retained in the central recessed portion of the second upper transverse arm of the second straight pivot arm, the second lower recessed channel section extends to integrally formed parallel second bent pivot arms which support a second bent pivot upper transverse retaining section with a second cylindrical mating dowel; and (e) a cylindrical cap with a first interior mating tunnel with the first cylindrical mating dowel rotatably retained in the first interior mating tunnel, the cylindrical cap including a spaced apart second interior mating tunnel with the second cylindrical mating dowel rotatably retained in the second interior mating tunnel, a cover label affixed to the an upper surface of the cap;

(f) wherein, after the cover wrapping is removed, the lower surface of the adhesive disc is affixed to a rear surface of the cell phone, and the cap is pulled away from the retaining base with the first and second straight pivot arms rotate about a respective first and second lower base to move the cap to an elevated position, and the respective first and second bent pivot arms rotate about the respective first lower recessed channel and second lower recessed channel of the elevated position to enable a person to place one finger in an interior space bounded by the retaining base, the first and second straight pivot arms, the first and second bent pivot arms, and a lower surface of the cap with the palm of the same hand as the finger resting on the rear surface of the cell phone, and the rotation of the retaining base within the fixed swivel base enables the person to hold the cell phone in a comfortable position for both holding as well as talking.

2. The apparatus in accordance with claim 1, further comprising: the retaining base is removable from the swivel base.

3. The apparatus in accordance with claim 1, further comprising: the cap is positioned on a surface to retain the cell phone in a horizontal position.

4. The apparatus in accordance with claim 1, further comprising: the cap is positioned on a surface to retain the cell phone in a vertical position.

5. An apparatus for retaining a cell phone, comprising:
(a) a cylindrical swivel base including a body having a lower surface affixed to an adhesive disc, the swivel base having an interior chamber;
(b) said retaining base rotatably retained within said interior chamber of said swivel base, the retaining base including a top section having a front recessed arcuate sidewall, a parallel opposite rear recessed arcuate sidewall, a left recessed arcuate sidewall and a parallel opposite right recessed arcuate sidewall, each of the front, rear, left and right recessed arcuate sidewalls are identical, the front and rear recessed arcuate sidewalls are each at ninety degrees to both the left and right recessed arcuate sidewalls;
(c) a first straight pivot arm including a first lower base extending to oppositely disposed parallel first side arms which extend to a first upper transverse arm with a first central recessed portion, the first lower base is rotatably affixed between left recessed arcuate sidewall and right recessed arcuate sidewall and is adjacent front recessed arcuate sidewall;
(d) a second straight pivot arm including a second lower base extending to oppositely disposed parallel second side arms which extend to a second upper transverse arm with a second central recessed portion, the second lower base is rotatably affixed between right recessed arcuate sidewall and left recessed arcuate sidewall and is adjacent rear recessed arcuate sidewall;
(e) a first bent pivot arm including a first lower recessed channel rotatably retained in the central recessed portion of the first upper transverse arm of the first straight pivot arm, the first lower recessed channel extends to integrally formed parallel and spaced apart first bent pivot arms which support a first bent pivot upper transverse retaining section;
(f) a second bent pivot arm including a second lower recessed channel rotatably retained in the central recessed portion of the second upper transverse arm of the second straight pivot arm, the second lower recessed channel extends to integrally formed parallel and spaced apart second bent pivot arms which support a second bent pivot upper transverse retaining section; and (g) a cylindrical cap having a body with a first interior mating tunnel and a spaced apart second interior mating tunnel, said first bent pivot upper transverse retaining section rotatably retained in the first interior mating tunnel and the second bent pivot upper transverse retaining section rotatably retained in the second interior mating tunnel;

(h) wherein a downward force on the top cap relative to the retaining base causes the apparatus for retaining a mobile phone to be in a compressed state with the first bent pivot arms resting against the lower surface of the top cap through rotation of the first bent pivot channel and the second bent pivot arms resting against the lower surface of the top cap through rotation of the second bent pivot channel, and said first parallel side arms of the first straight pivot arm resting against the lower surface of the top cap through rotation of the first lower base portion and said second parallel side arms of the second straight pivot arm resting against the lower surface of the top cap through rotation of the second lower retaining base portion;

(i) wherein an upward force on the top cap relative to the base causes apparatus for retaining a mobile phone to be in an expanded condition with the first bent pivot arm extending away from the lower surface of the top cap through rotation of the first bent pivot channel and the second bent pivot arm extending away from the lower surface of the top cap through rotation of the second bent pivot channel, and said first parallel side arms of the first straight pivot arm extending away from the top surface of the retaining base through rotation of the second bent pivot arms and said second parallel side arms of the second straight pivot arm extending away from the top surface of the retaining base through rotation of the second lower base portion, resulting in an interior space between the top cap, the base, aligned first parallel pivot arms and first parallel side arms and the aligned second parallel pivot arms and second parallel side arms.

6. An apparatus for retaining a cell phone comprising:

(a) a swivel base including a circumferential sidewall with a circumferential exterior surface and a circumferential interior surface which surrounds an interior chamber, the circumferential interior surface includes at least two spaced apart upper circumferential teeth which are adjacent a top surface of the swivel base leaving a circumferential gap between the at least two spaced apart upper circumferential teeth and a lower portion of a circumferential interior surface;

(b) a retaining base sized to be rotatably retained within the interior chamber of said swivel base, the retaining base including a front recessed arcuate sidewall, a parallel opposite rear arcuate recessed sidewall, a left recessed arcuate sidewall and a parallel opposite right arcuate recessed sidewall, the front and rear recessed sidewalls are each at ninety degrees to both the left and right arcuate recessed sidewalls, the four arcuate recessed sidewalls surround an interior section;

(c) the retaining base including a first straight pivot arm having a first lower base with opposite pin members, the first lower base extends to oppositely disposed parallel side arms which extend to first upper transverse arm with a first central recessed portion, the first upper transverse arm is integrally formed with and between parallel side arms, the first upper transverse arm is parallel to first lower base, the first lower base is rotatably affixed between left recessed arcuate sidewall and right recessed arcuate sidewall and is adjacent the front recessed arcuate sidewall, a first bent pivot arm includes a first lower recessed channel section rotatably retained in the central recessed portion of the first upper transverse arm of the first straight pivot arm, the first lower recessed channel section extends to integrally formed parallel first bent pivot arms which support a first bent pivot upper transverse retaining section with a first cylindrical mating dowel;

(d) the retaining base including a second straight pivot arm having a second lower base with opposite pin members, the second lower base extends to oppositely disposed parallel side arms which extend to second upper transverse arm with a second central recessed portion, the second upper transverse arm is integrally formed with and between parallel side arms, the second upper transverse arm is parallel to second lower base, the second lower base is rotatably affixed between left recessed arcuate sidewall and right recessed arcuate sidewall and is adjacent the rear recessed arcuate sidewall, a second bent pivot arm includes a second lower recessed channel section which is rotatably retained in the central recessed portion of the second upper transverse arm of the second straight pivot arm, the second lower recessed channel section extends to integrally formed parallel second bent pivot arms which support a second bent pivot upper transverse retaining section with a second cylindrical mating dowel; and (e) a cylindrical cap with a first interior mating tunnel with the first cylindrical mating dowel rotatably retained in the first interior mating tunnel, the cylindrical cap including a spaced apart second interior mating tunnel with the second cylindrical mating dowel rotatably retained in the second interior mating tunnel.

* * * * *